(12) United States Patent
Kiest, Jr.

(10) Patent No.: US 9,714,735 B2
(45) Date of Patent: Jul. 25, 2017

(54) METHOD OF REPAIRING A MANHOLE AND PIPES

(71) Applicant: LMK Technologies LLC, Ottawa, IL (US)

(72) Inventor: Larry W. Kiest, Jr., Ottawa, IL (US)

(73) Assignee: LMK Technologies, Inc., Ottawa, IL (US)

( * ) Notice: Subject to any disclaimer, the term of this patent is extended or adjusted under 35 U.S.C. 154(b) by 392 days.

(21) Appl. No.: 14/287,360

(22) Filed: May 27, 2014

(65) Prior Publication Data

US 2015/0345686 A1    Dec. 3, 2015

(51) Int. Cl.
*F16L 55/10* (2006.01)
*F16L 55/162* (2006.01)
*E02D 29/12* (2006.01)
*F16L 55/165* (2006.01)
*F16L 55/179* (2006.01)

(52) U.S. Cl.
CPC ............ *F16L 55/162* (2013.01); *E02D 29/12* (2013.01); *F16L 55/1651* (2013.01); *F16L 55/1654* (2013.01); *F16L 55/179* (2013.01)

(58) Field of Classification Search
USPC .................. 138/97, 98; 405/150.1, 184.2
See application file for complete search history.

(56) References Cited

U.S. PATENT DOCUMENTS

| | | | | |
|---|---|---|---|---|
| 5,265,981 A * | 11/1993 | McNeil | ................... | E02D 29/12 138/97 |
| 5,490,744 A * | 2/1996 | McNeil | ................... | B29C 63/28 138/97 |
| 5,531,485 A * | 7/1996 | House | ................... | E02D 29/12 156/71 |
| 6,018,914 A * | 2/2000 | Kamiyama | ............ | B29C 63/34 404/25 |
| 6,401,759 B1 * | 6/2002 | Kamiyama | ............ | B29C 63/36 138/97 |
| 2006/0188339 A1 * | 8/2006 | De Bruijn | .......... | B29C 63/0086 405/150.1 |
| 2012/0009020 A1 * | 1/2012 | Kiest, Jr. | ................. | B29C 63/20 405/150.1 |
| 2012/0112375 A1 * | 5/2012 | Kiest, Jr. | ................. | B29C 63/34 264/32 |
| 2012/0138184 A1 * | 6/2012 | Kiest, Jr. | ............... | F16L 55/179 138/98 |
| 2012/0141210 A1 * | 6/2012 | Kiest, Jr. | ............... | E02D 29/128 405/150.2 |

* cited by examiner

*Primary Examiner* — James Hook
(74) *Attorney, Agent, or Firm* — Nyemaster Goode, P.C.

(57) ABSTRACT

A method of repairing a manhole is provided. A mastic material capable of curing and hardening as applied to a lower portion of the manhole, including the barrel, bench, and into at least one pipe line extending from the manhole. A resin saturated liner may also be included into a portion of the pipe extending from the manhole. A manhole liner saturated with a resinous material is then positioned in the manhole, and the manhole liner, pipe liner, and mastic material are configured to cure at approximately the same time to form a homogenous, repaired interior of the manhole, including a portion extending into the pipe. The pipe or pipes can then be repaired in a manner such as inverting a liner or bladder into the pipe. In the addition of an end seal at the juncture between the pipe and manhole is also contemplated for further sealing the juncture.

25 Claims, 7 Drawing Sheets

METHOD OF REPAIRING A MANHOLE AND PIPES

FIELD OF THE INVENTION

The present invention relates generally to the repair of manholes. More particularly, but not exclusively, the invention relates to a method of repairing approximately the full interior of a manhole, including a portion of any pipe extending through or away from a manhole, to form a monolithic cured-in-place manhole liner.

BACKGROUND OF THE INVENTION

Conventional manholes include a lower or bottom pad, which may also be known as a bench, a barrel having a relatively constant diameter adjacent to and extending generally upward from the pad, a concentric or eccentric cone extending upwardly from the barrel, one or more adjusting rings to adjust the overall height of the manhole, and a casting frame on top of the adjusting rings to support a lid at an elevation substantially level with the surrounding pavement. The cone may also be known as a corbel, and the adjusting ring area may be referred to as a chimney. The casting frame is preferably sealed to the uppermost adjusting ring to preclude or minimize water flow into the manhole. Furthermore, one or more pipes may extend from the manhole. For example, a pipe may extend through a portion of the bench at a pipe invert, with the pipe continuing to extend from the pipe invert away from the manhole. In addition, other pipes may extend from any of the other portions of the manhole.

One problem with existing manholes is that many were made long ago, and oftentimes, were made of brick. Due to the old age of the manholes, as well as the materials used to make them, many manholes have begun to deteriorate or have damaged areas. The damaged areas create weak spots, which may allow water to infiltrate the sewer system and also lead to the eventual collapse of the manhole.

Methods exist for repairing the walls of manholes. One such method involves the use of a liner and a bladder to repair the manhole wall. The liner and bladder are placed in the manhole, and the bladder is expanded to press the liner against the manhole wall. The liner is impregnated with a resin and pressed against the manhole wall. Another method includes trawling, slinging, spraying, or otherwise applying a resinous or grout material to the manhole wall along either the full height of the manhole or along a damaged portion of the manhole. A liner and/or bladder is then positioned in the manhole and expanded against the material until the material cures.

However, in both of these instances, only the portions of the manhole along the height of the manhole are repaired. The bench is generally not repaired, and the juncture between any pipe extending through or from the manhole is also not repaired. These structures must be repaired separately, which increases the time of repair, as well as the difficulty in making the repairs. For example, each repair must wait for the curable material to cure and harden before repairing the next portion, which can greatly add to the total repair time. Furthermore, cured portions of the manhole repair may make it more difficult to repair subsequent portions of the manhole, which can also increase the time and cost for manhole repair. This also becomes an issue when one or more of the pipes extending through and/or from the manhole need repaired, as this creates additional time and resources.

Therefore, there is a need in the art for a method of repairing a manhole and pipes extending through and/or from the manhole that produces a generally monolithic repair interior covering most or all of the interior of the manhole, as well as at least a portion of the interior of any pipe. The method will allow the pipes to then be repaired from the repaired manhole with greater ease.

SUMMARY OF THE INVENTION

It is therefore a primary object, feature, and/or advantage of the present invention to overcome deficiencies in the art.

It is another object, feature, and/or advantage of the present invention to provide a method of repairing a manhole It is a further object, feature, and/or advantage of the present invention to repair the interior of a manhole with a monolithic, cured-in-place liner.

It is yet another object, feature, and/or advantage of the present invention to provide a method of repairing a manhole and pipes extending through and from the manhole.

It is still another object, feature, and/or advantage of the present invention to provide a homogenous, single unit cured-in-place manhole liner.

It is a yet a further object, feature, and/or advantage of the present invention to repair pipe lines extending from a manhole after the manhole has been repaired with a portion of the pipelines repaired at the same time as the manhole.

These and/or other objects, features, and advantages of the present invention will be apparent to those skilled in the art. The present invention is not to be limited to or by these objects, features and advantages. No single embodiment need provide each and every object, feature, or advantage.

According to an aspect of the invention, a method of repairing a manhole having a bench, a barrel extending generally upward from the bench, a chimney extending from the barrel, and at least one pipeline extending from a portion of the manhole is provided. The method includes applying a mastic material to at least a portion of the bench and barrel, and at least partially into the at least one pipeline. A pipe liner impregnated with a material capable of curing and hardening is positioned at least partially into the at least one pipeline and into contact with a wall of the pipeline. A manhole liner impregnated with a material capable of curing and hardening is positioned in the manhole. The manhole liner is pressed against a wall of the manhole, the mastic material, and/or a portion of the pipe liner, and the mastic material, pipe liner, and manhole liner are allowed to cure and harden.

The pipeline can then be repaired by positioning a main pipe liner impregnated with a material capable of curing and hardening into the pipeline after the mastic material, pipe liner, and manhole liner have cured. An end seal can overlap the previously repaired portion of the pipeline extending from the manhole.

According to another aspect of the invention, a method of repairing a manhole having a bench, a barrel generally upward from the bench, a chimney extending from the barrel, and a pipeline extending from a portion of the manhole and including a pipe invert in the bench is provided. The method includes applying a mastic material capable of curing to the bench, barrel, pipe invert and at least partially into the pipeline, positioning a first pipe liner impregnated with a material capable of curing and hardening at least partially into the pipeline, pressing the pipe liner against a wall of the pipeline, positioning a manhole liner impregnated with a material capable of curing and hardening in the manhole, and pressing the manhole liner against a wall of the manhole.

According to yet another aspect of the invention, a method of repairing a manhole is provided. The method includes applying a mastic material capable of curing and hardening about a lower portion of the manhole and any pipes extending from the manhole, positioning a first pipe liner impregnated with a material capable of curing and hardening at least partially into each pipe extending from the manhole, with the mastic material between the first liner and a wall of the pipes, positioning a manhole liner impregnated with a material capable of curing and hardening into the manhole, and pressing the first pipe liners and manhole liner against the wall of the pipes and the manhole and allowing the materials to cure and harden.

DETAILED DESCRIPTION OF THE PREFERRED EMBODIMENTS

Figure 1:
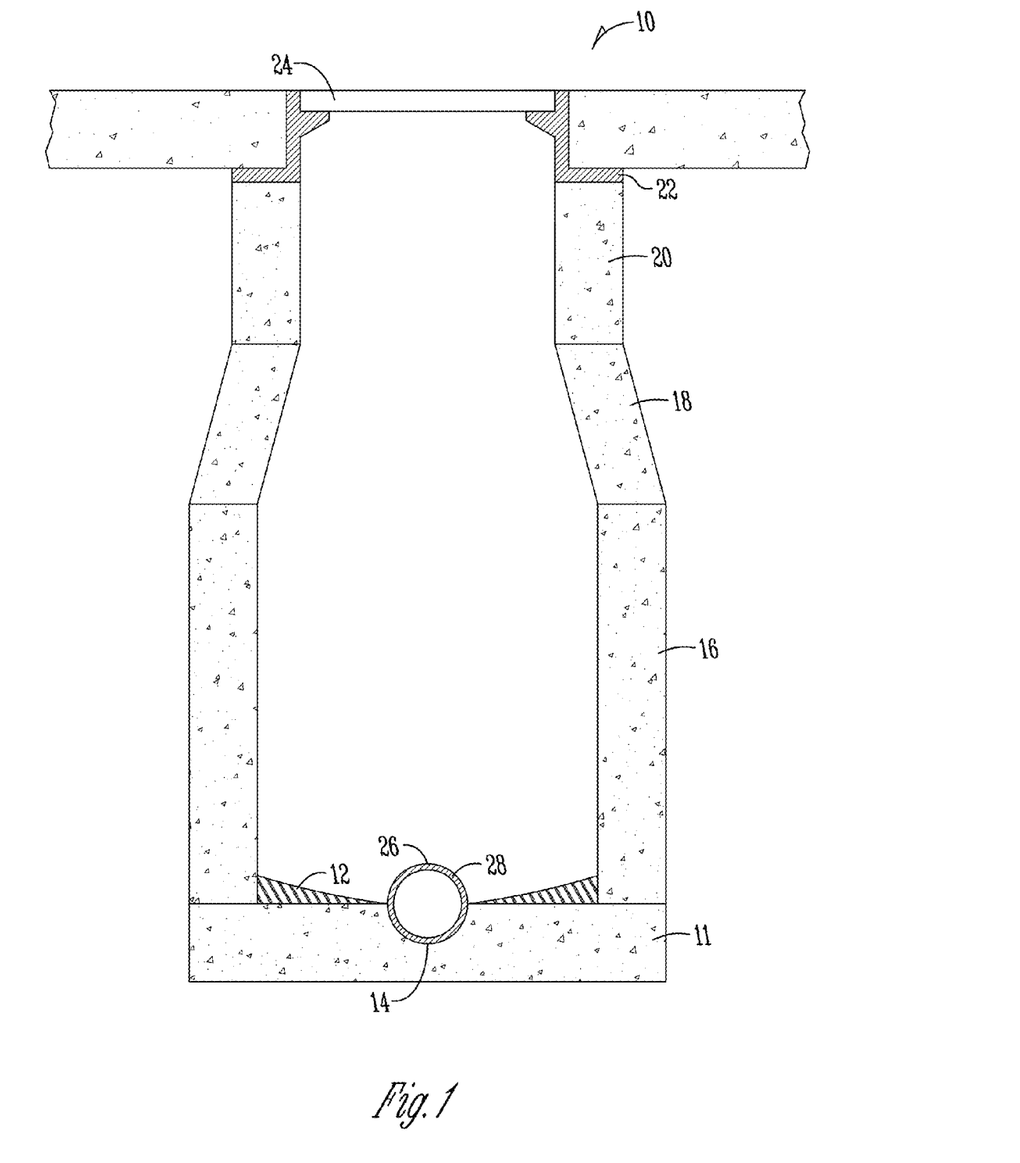
FIG. 1 is a sectional view of a manhole with a pipeline in line with the pipeline.

FIG. 1 is a sectional view of a manhole 10 having a pipe line 26 extending through and from the manhole 10. A manhole 10, such as shown in FIG. 1, generally comprises either brick or concrete structures. The present invention is a method and means of repairing a manhole 10, including both brick and concrete manholes. While the general components of a manhole are the same, there are a few differences between the concrete and brick manholes. For example, as shown in the figures, the exemplary manhole 10 of the figures includes a base 11. A bench 12 is positioned generally at the base 11 and includes gently sloping surfaces towards a pipe invert 14 in the base 11. The pipe invert 14 is aligned with the pipe 26 to allow materials flowing through the pipe 26 to pass through the manhole base 11. Extending generally upward from the base 11 is a barrel 16 comprising the manhole wall.

Extending from the barrel 16 is a cone or corbel 18. As mentioned, many of the components are similar between concrete and brick manholes. However, in concrete manhole structures, the section is generally referred to a cone 18. In brick manholes, the structure is generally referred to as a corbel 18. However, for purposes of the present invention, the terms cone and corbel are to be used interchangeably to define the portion of the manhole referred to by the numeral 18. Furthermore, the cone 18 may be concentric, as shown through the figures, or maybe eccentric, such that the shape of the manhole may vary at one side or one portion compared to the other.

Extending generally upward from the cone or corbel 18 is a riser or chimney 20. Similar to the section referred to by the numeral 18, concrete manholes at this region may be known as a riser 20, while brick manholes at this section may be known as a chimney 20. However, it is to be understood that the terms riser and chimney may be used interchangeably throughout the present invention to refer to the section generally shown by the number 20 in the figures. In addition, the region shown by the number 20 may include adjusting rings to vary the height of the manhole 10.

Positioned generally at an upper end of the chimney 20 is a casting frame 22 for housing a cover 24. Furthermore, as shown in FIG. 1, the pipe 26 will include a pipe junction 28 at the position between the opening of the pipe 26 and the wall of the manhole 10, for instance at the barrel 16 of the manhole 10. While the manhole 10 shown throughout the figures includes a pipe extending from opposite directions of the manhole wall and extending through the bench 12 and base 11 of the lower portion of the manhole 10, it is to be understood that the manhole 10 may include any number of pipe lines 26 extending through or from the manhole at any orientation therefrom. For example, the pipes may extend at 90° angles from the barrel, which may be referred to as tee shaped pipes, or may be at obtuse angles to the barrel (wye angled pipes). For purposes of the embodiments of the invention, the figures show an exemplary embodiment of a manhole that is repaired with the present invention and that includes a pipe extending at approximately a 90° from the manhole and extending through the manhole.

Figure 2:
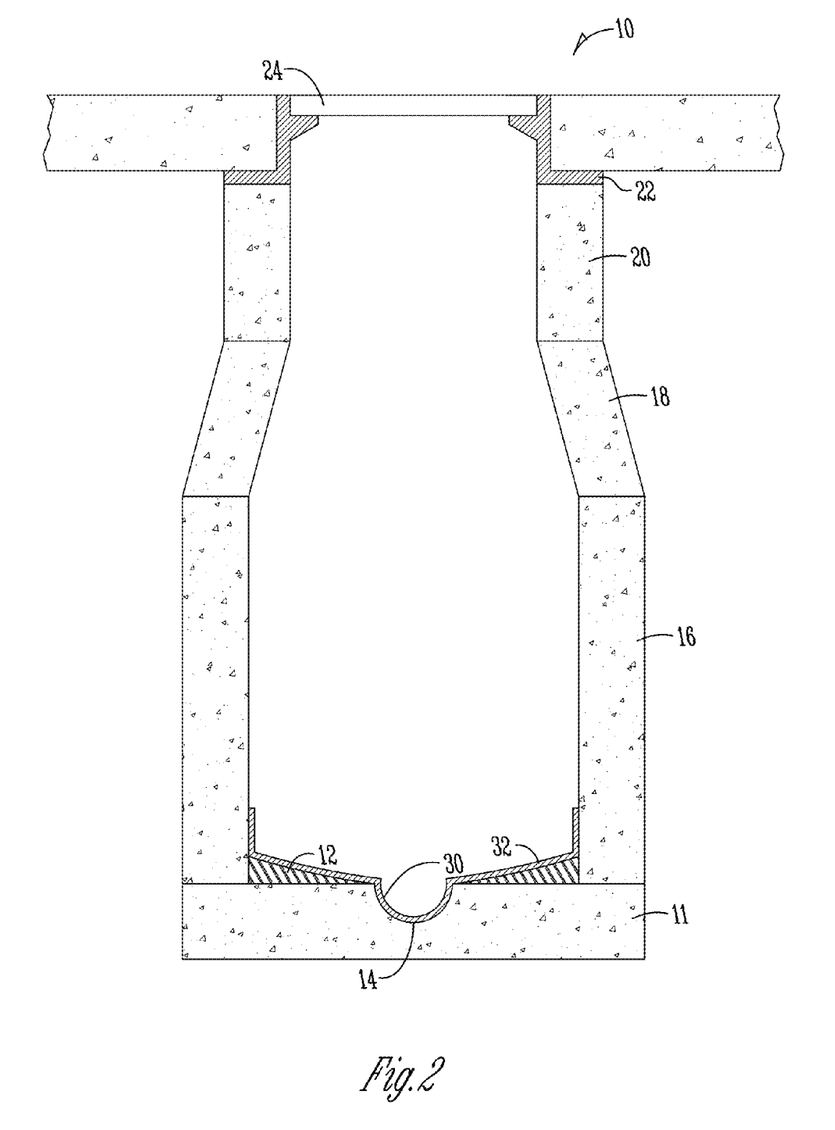
FIG. 2 is a sectional view of a manhole in line with a pipeline showing a portion of the manhole repair.
Figure 3:
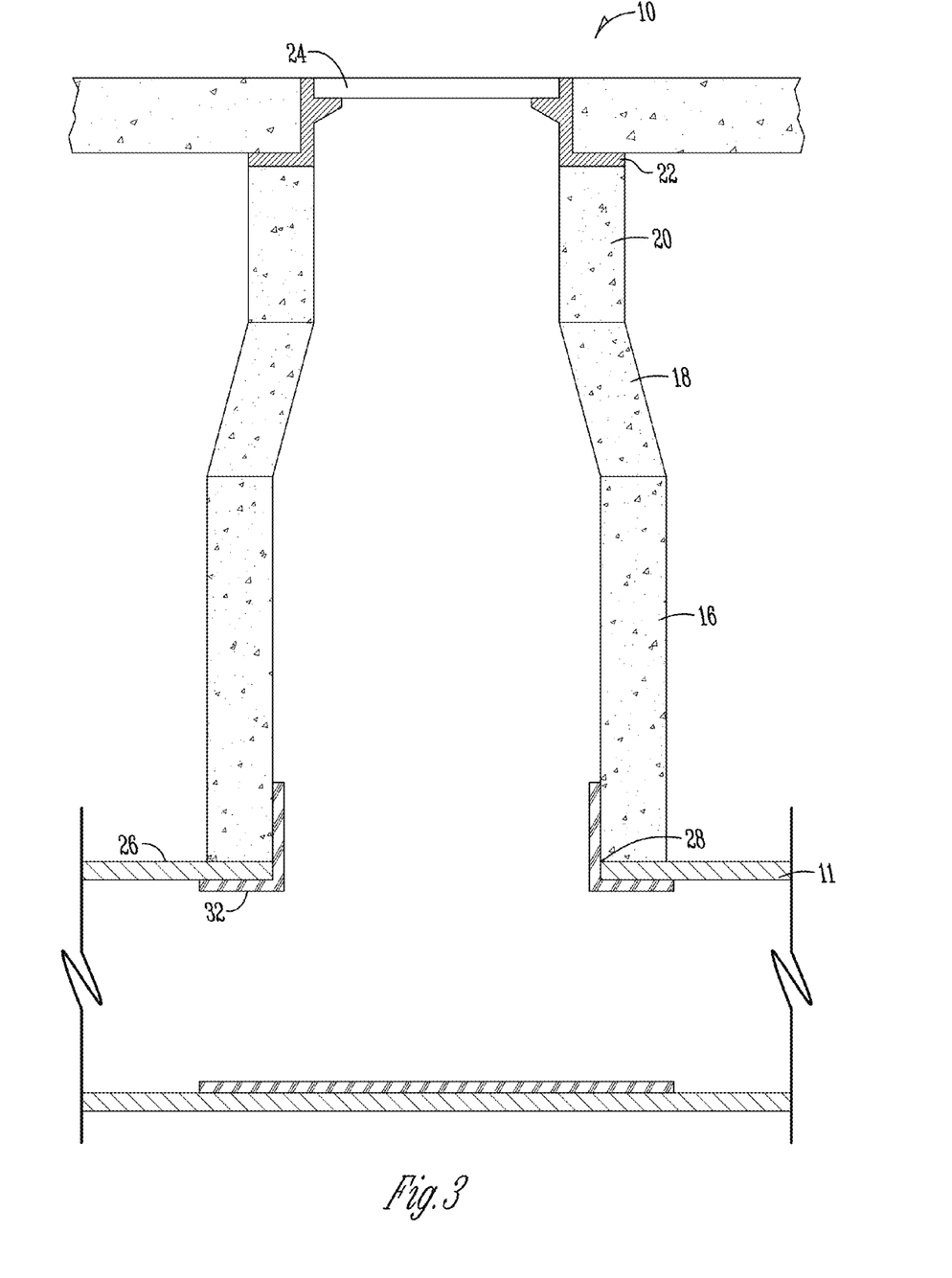
FIG. 3 is a view similar to FIG. 2 showing a side view of the manhole and pipeline extending therethrough.

FIGS. 2 and 3 show the application of a mastic material 32 to a lower portion of the manhole 10. The mastic material 32, which may be a sealant or epoxy resin, can be applied by trawling, dispensing, painting, slinging, or otherwise applying the material 32 to the portions of the manhole 10, including into a portion of the pipe 26. The mastic material 32 is applied by buttering up the entire opening of the pipe inlet and outlet, covering the bench 12 of the manhole 10, and further applying the material to a portion of the barrel 16. For example, the mastic material 32 may be applied approximately a foot into each pipe extending from the manhole 10, as well as a foot up the manhole barrel 16, while covering the bench 12. However, the exact distance and/or amount for applying the mastic material 32 about the interior of the manhole 10 and/or pipes 26 is not to be exclusive, and generally any amount of mastic material in any distance and direction into the manhole 10 and/or pipe 26 may be included as part of the invention.

The mastic material 32 can be selected such that it has a pot time sufficient to repair additional elements of the manhole 10 and/or pipes 26 before the material cures. In addition, the mastic material 32 should comprise a sealant such that it is able to aid in repairing and sealing the juncture 28 between the pipe 26 and the manhole 10. The application of the mastic material 32 to the bench 12, barrel 16, invert 14, pipe channel 30, and pipe 26 will provide a rehabilitated floor for the interior of the manhole 10 that extends into each pipe, at approximately one to two feet into each pipe.

Figure 4:
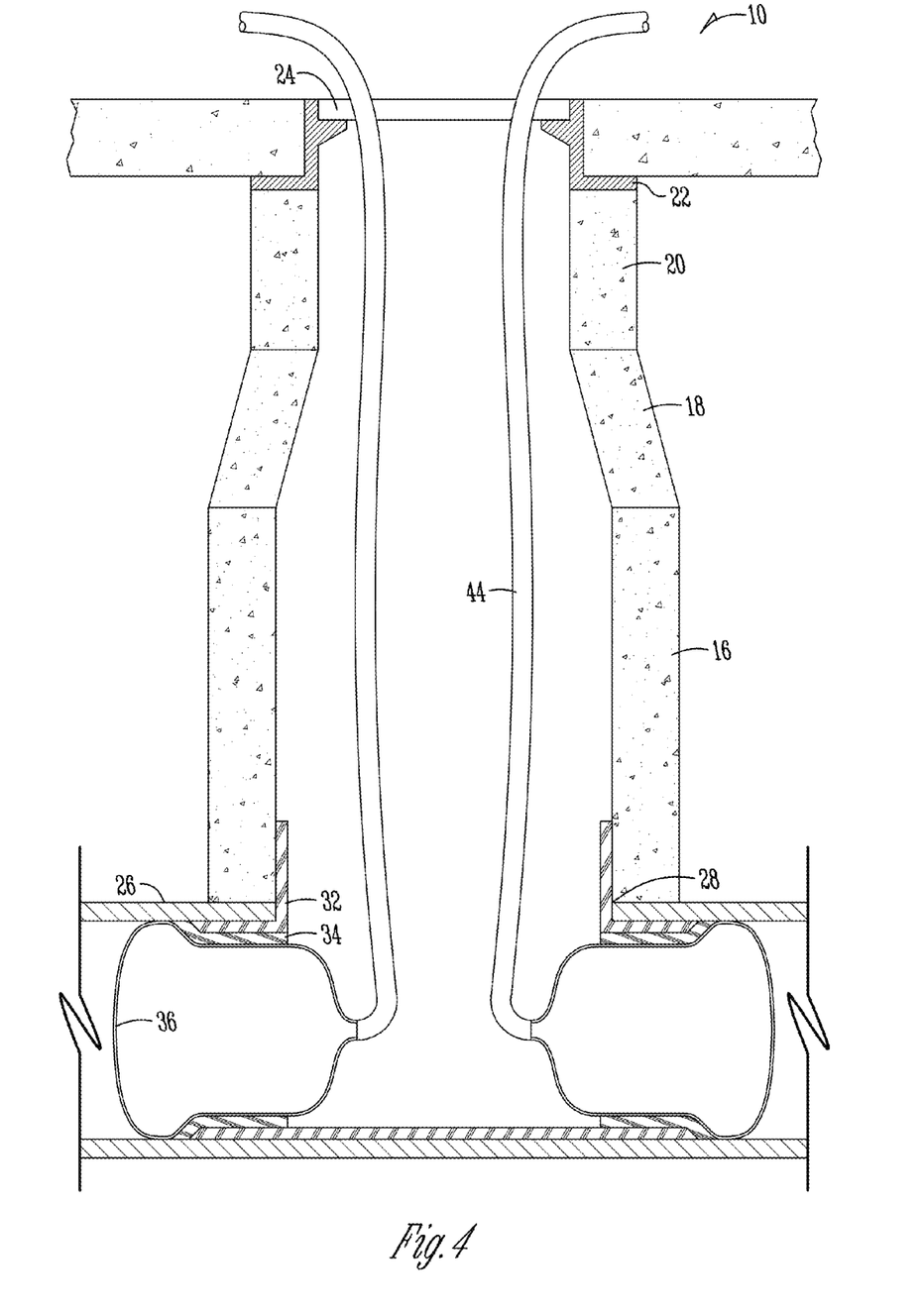
FIG. 4 is a side sectional view of the manhole and pipeline showing additional repair of the structure.

After the mastic material 32 has been applied to the lower portion of the manhole 10 and at least partially into the interior of the pipes 26 extending through and from the manhole, a first section of pipe liner 34 is positioned at least partially into each section of pipe 26 extending from the manhole 10. The first pipe liner 34 extends at least partially into interior of the manhole 10, and is positioned adjacent the mastic material 32 at the pipe juncture 28 and in the pipe 26. The pipe liner 34 may comprise a resin impregnable material such as felt or the like. Once the liners 34 have been saturated with the resinous material capable of curing and hardening, the one or more liners 34 are positioned to extend at least partially within to the pipes 26. The liners 34, which comprise tube shaped members, are then pressed against the mastic material 32 and/or the pipeline walls. A bladder or plug 36 may be used to press the liners 34 into contact with the mastic material and/or walls of the pipe 26. As shown in FIG. 4, the use of plugs is shown. The plug 36 is positioned generally within the pipe liner tube 34 (the lumen of the tube) and air or another fluid is provided to the plug 36 via tubes 37 to inflate and expand the plug into contact with the pipe liner 34, which presses the pipe liner into contact with the mastic material 32 and/or wall of the pipe line 26. It should be appreciated that the resin used with the liners 34 should have a pot time such that it does not cure before the curing of the mastic material 32 applied to the interior of the manhole and pipe.

Figure 5:
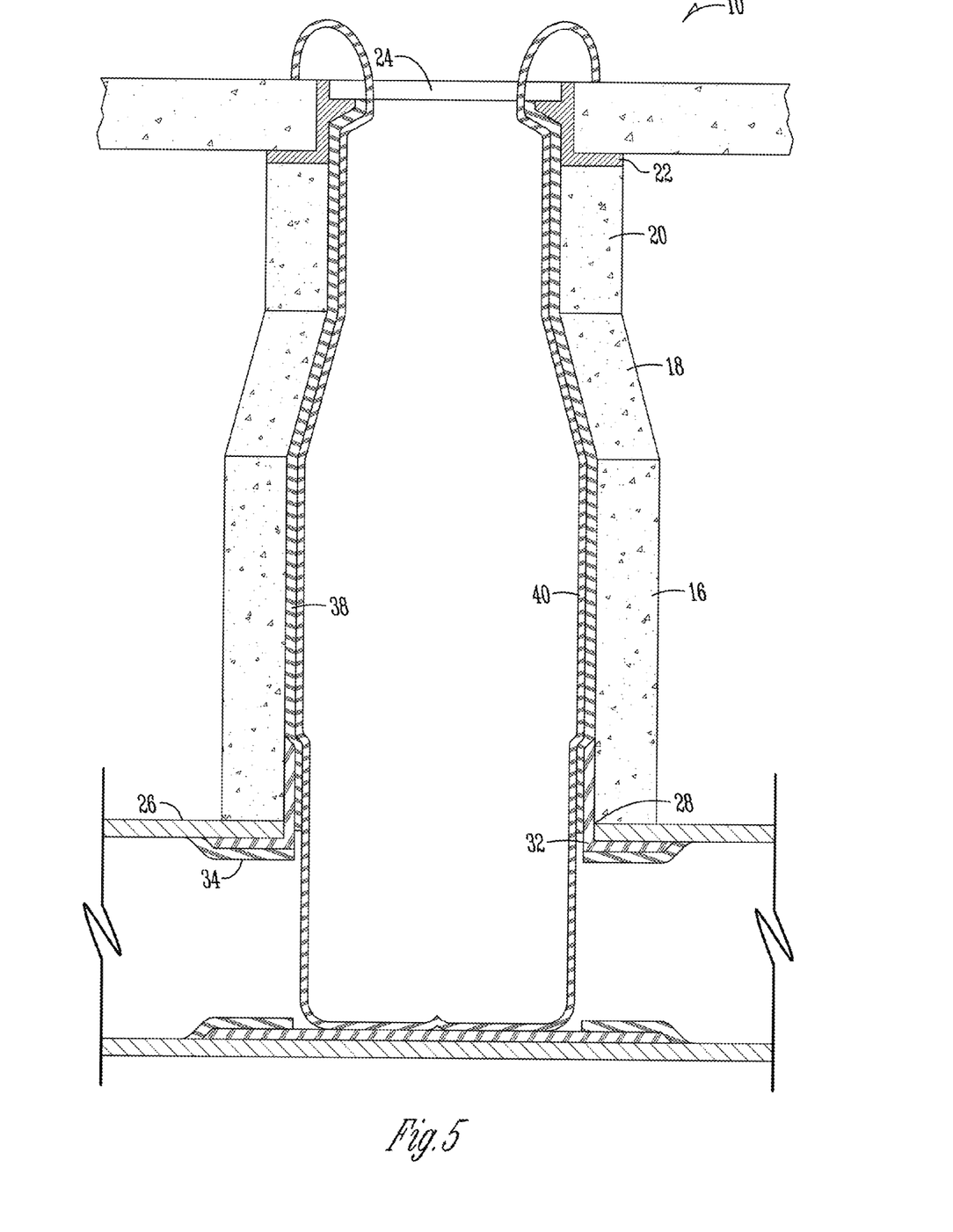
FIG. 5 is a view similar to FIG. 4 showing additional repair of the manhole and pipeline.

FIG. 5 shows the positioning of a manhole liner 38 and manhole bladder 40 within the manhole 10 to further repair the interior of the manhole 10 and pipe 26. The manhole liner 38 comprises a material capable of being impregnated with a resinous material capable of curing and hardening, such as felt or the like. The bladder 40 is an inflatable member positioned generally within the manhole liner 38, and the bladder 40 is filled with a fluid, such as air or steam, to expand the bladder outward to press the manhole liner into contact with the walls of the manhole 10 and/or a portion of the mastic material 32. As mentioned, the manhole liner 38 is impregnated with a resinous material capable of curing and hardening.

The resinous materials of the manhole liner 38 and pipe liner 34, as well as the mastic material 32 are then allowed to cure after the elements have been positioned within the manhole 10 and/or pipe 26. Thus, while the manhole bladder 40 is inserted into the manhole 10, the plugs 36 or other pipe bladder may be inserted into the pipe line 26 to press the pipe liner against the wall and/or mastic material 32. The pressure is maintained until the resinous materials of the liners 34, 38, as well as the mastic material 32, has cured and hardened. The pipe liners 34, the mastic material 32, and the resin saturated manhole liner tube 38 all cure as a single unit and form a monolithic, cured in placed manhole liner that extends at least a portion into each pipe extending from the manhole 10. For example, it is contemplated that the pipe liners 34 may extend into the pipe approximately one or two feet. Having the elements cure at approximately the same time provides for a somewhat uniform interior for the manhole 10 and at least a portion of the pipe 26.

In addition, it should be appreciated that not all the elements be required to provide a substantially uniform, rehabilitated interior of the manhole and/or pipes. For example, the first pipe liners 34 may not be required in all embodiments of the present invention, and it may just be the application of the mastic material 32 at a lower end of the manhole 10 and into at least a portion of the pipe liners 26, as well as the use of the resin saturated manhole liner 38 to repair the interior of the manhole. This will still provide a single unit cured in place manhole liner extending into a portion of the pipes, which includes the sealant at the pipe juncture 28 between the pipe line 26 and the manhole 10. In addition, the present invention contemplates the use of a flanged manhole liner 38, which extends at least partially into a portion of the pipe liner 26 at the pipe juncture 28 to provide for a rehabilitated manhole 10 having a portion extending into the pipe line 26. However, the mastic material and/or resin absorbent liners cure at approximately the same time so as to form a homogenous, single unit cured in place manhole liner. This is advantageous over previous methods of repairing a manhole.

Figure 6:
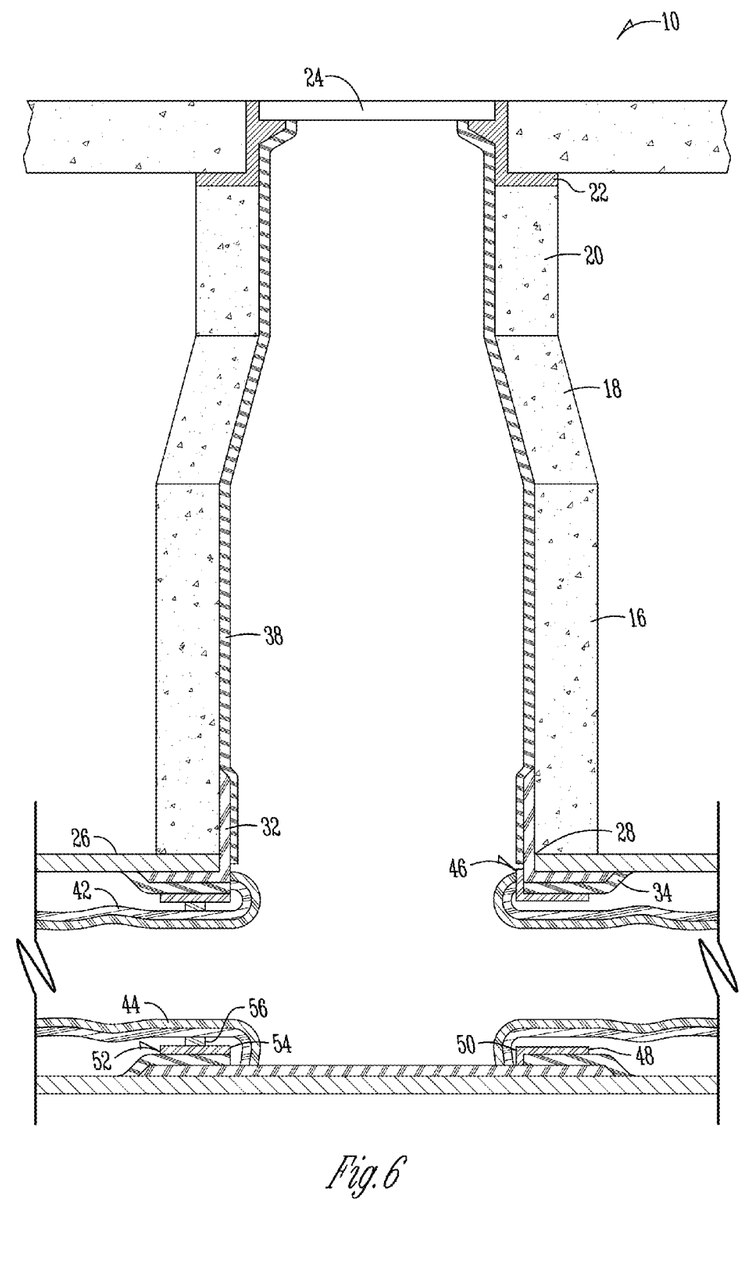
FIG. 6 is a view of the manhole showing additional repair to the pipeline extending through and from the manhole.
Figure 7:
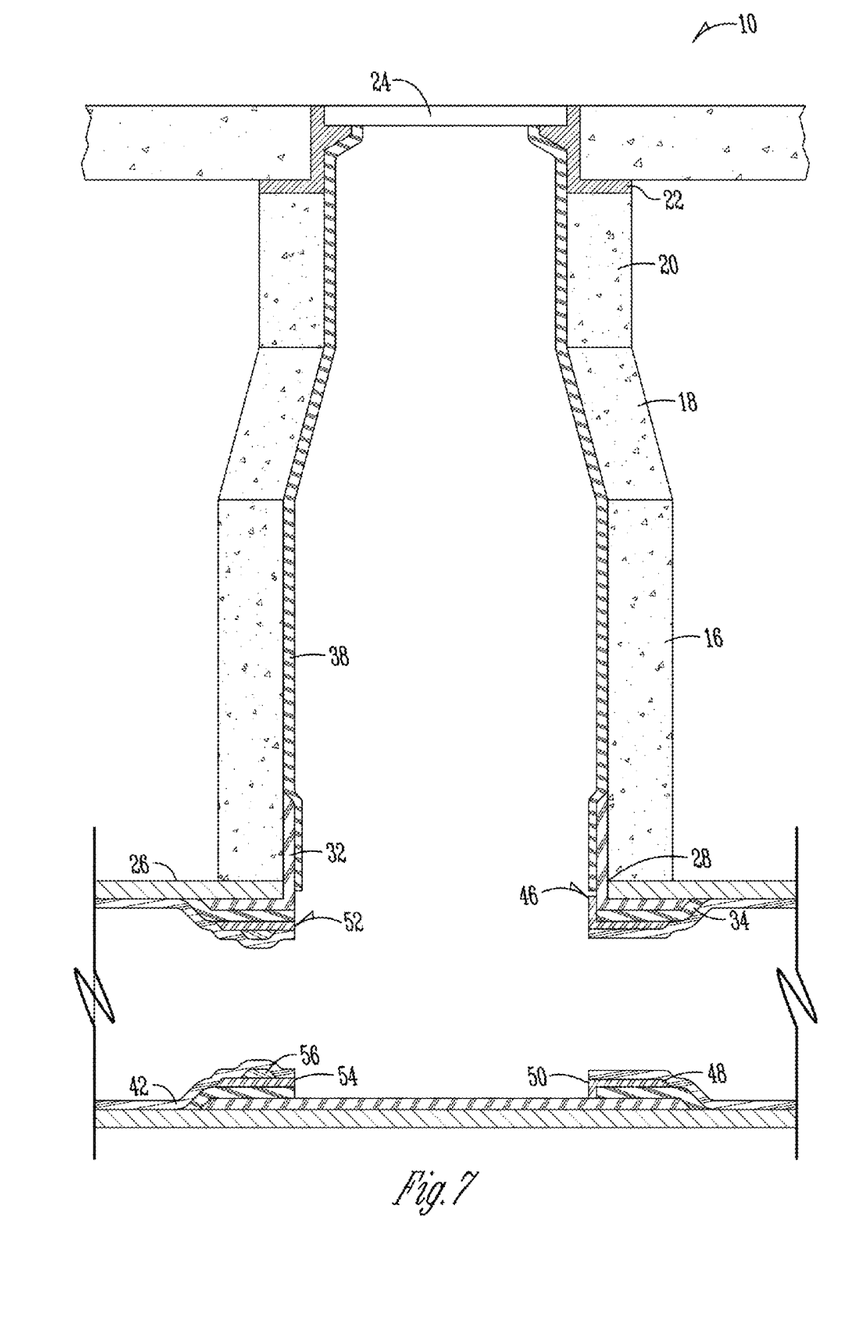
FIG. 7 is a side sectional view of the repaired manhole and pipeline.

Furthermore, FIGS. 6 and 7 show additional repairs to the pipe line 26 extending through and from the manhole 10, which may be repaired after the homogenous and/or monolithic cured in place manhole liner extending into the pipe 26 has cured and hardened. As mentioned, the repairs shown in FIGS. 1-5 will provide a rehabilitated interior of the manhole 10, which includes a portion extending into at least one pipe extending through or from the manhole 10. However, the pipes extending through and from the manhole 10 may also need to be rehabilitated as well. FIGS. 6 and 7 show a method of repairing such pipes after the manhole 10 has been rehabilitated.

After the manhole repair elements have cured and hardened, a main pipe liner 42 may be extended into one or more of the pipes 26 in any direction that they may extend from the manhole 10. The main pipe liner 42 comprises a resin impregnable material, such as felt or the like, that is saturated with a resinous material capable of curing and hardening. A main pipe bladder 44 may also be included to expand within the main pipe liner 42 to press the pipe liner 42 against the walls of the pipe 26, during which time the materials saturated within the liner 42 can cure and harden. FIG. 6 shows the pipe liner 42 and pipe bladder 44 inverted into the pipe 26 in both directions, for purposes of the invention referred to as right and left with respect to FIGS. 6 and 7. The use of inverting a liner and bladder 42, 44 into a pipe, such as pipe 26, is known in the art and is generally described in U.S. Pat. No. 8,567,451, which is hereby incorporated in its entirety. In addition, the liner and bladder 42, 44 may be pulled in place into the pipe 26, which is also known in the art.

Furthermore, the repair of the pipe 26 in both the right and left directions shown in FIGS. 6 and 7 may include the use of end seals 46, 52. The end seals, and their use, are described in U.S. Pat. No. 8,240,340, which is hereby incorporated in its entirety. As shown in FIGS. 6 and 7, the pipe repair extending to the right of the manhole 10 includes the use of an end seal 46 having a tube portion 48 and a flange section 50 extending generally from one of the ends of the tube section. The flange 50 allows the end seal to be positioned about the juncture 28 of the manhole 10 and pipe 26 to provide additional sealing at said juncture. The end seal, as is described in the '340 patent, may comprise a hydrophilic material, or an absorbable material saturated with a hydrophilic material. Furthermore, the end seal may be compressible. As is known, the hydrophilic characteristics of the end seal will provide swelling when in contact with a liquid, such as water, to further aid in sealing the junction 28 of the pipe 26 and manhole 10.

The pipe repair extending to the left of the manhole 10 shown in FIGS. 6 and 7 includes an end seal 52 comprising only a tube portion 54. The end seal 52 will be positioned generally at or near the juncture of the manhole 10 and the pipe 26 to provide sealing thereof. In addition, the end seal 52 may be supported by a retaining ring 56. A retaining ring 56 and use thereof is shown and described in U.S. Pat. No. 8,240,341, which is hereby incorporated in its entirety. While either of the end seals 46, 52 may be self-supporting, the use of the retaining ring 56 may aid in the supporting of the end seal such that the end seal will not collapse prior to the curing and hardening of the pipe liner 42 positioned in the lumen of the end seal. In addition, the retaining ring 56 may be used with either or both types of end seals, tube or tube and flange.

The bladder 44 presses the liners 42 against the wall of the pipe 26, end seal, mastic material 32, and/or first pipe liner 34, and maintains its positioning against said element(s) until the resinous material has cured and hardened. The resinous material that is saturated into the pipe liner 42 may be a time curing material such that the passage of time will allow the materials to cure, or maybe of such a composition whereas the curing time can be reduced. For example, a thermoset or photo curing resin can be used and is contemplated by the present invention whereas the introduction of heat or light speeds up the curing time for the material. Other types of materials, including epoxies, resins, and grouts, are intended to be included as part of the present invention. Once the material has hardened, the bladders are removed, and a repaired manhole and pipes extending therefrom remains.

Thus, the present invention provides the advantages of reducing the amount of time to repair the interior of the manhole and any pipes extending through and from said manhole. This is done by including the repair of, or at least part of, one or more pipes extending from the manhole during repair of said manhole. Such repair, including the addition of mastic material and/or liner material at the junction between the manhole and the pipe will further aid in sealing said juncture, which is an area known to be weak and/or leaky for existing manhole/pipe connections.

It is further contemplated that any combination or sub-combination of the elements shown and described hereto for may be incorporated into an embodiment for repair of the manhole and/or pipes extending therefrom. Any of the elements may be omitted, while still providing for the repair of the manhole and pipe. For example, it is contemplated that not all embodiments require the use of an end seal when repairing a pipe extending from the manhole. As mentioned, the present invention also contemplates the omission of the first pipe liner 34. For example, one embodiment of the present invention contemplates the mastic material be applied at a lower portion of the manhole including the bottom floor of the manhole and into a portion of a pipe or pipes extending therefrom. The manhole liner can then be positioned and cured in the manhole with the curing of the manhole liner and the mastic material occurring at approximately the same time. Next, a pipe extending from the manhole can be repaired in the manner shown and described, with the omission of the components of the first liner and end seal. However, the end seal could also be used with said embodiment. Therefore, as mentions, the present invention contemplates the use of any combination of said components, including the omission of components. However, it is to be appreciated that the methods shown and described will be provide for rehabilitation of the interior of a manhole and at least a portion of pipes extending from said manhole to form a monolithic or homogenous cured in place interior for the manhole. This will provide for easier repair of the pipes extending from the manhole.

It should be understood that additional changes and modifications to the embodiments shown and described herein will be apparent to those skilled in the art. Such changes and modifications may be made without departed from the spirit and scope of the invention, and without diminishing its advantages. It is intended, therefore, that such changes and modifications be covered by the embodiments of the invention.

What is claimed is:

1. A method of repairing a manhole having a bench, a barrel extending generally upward from the bench, a chimney extending from the barrel, and at least one pipeline extending from a portion of the manhole, the method comprising:
    applying a mastic material to at least a portion of the bench and barrel, and at least partially into the at least one pipeline;
    positioning a pipe liner impregnated with a material capable of curing and hardening at least partially into the at least one pipeline and into contact with a wall of the pipeline;
    positioning a manhole liner impregnated with a material capable of curing and hardening in the manhole;
    pressing the manhole liner against a wall of the manhole, the mastic material, and/or a portion of the pipe liner; and
    allowing the mastic material, pipe liner, and manhole liner to cure and harden.

2. The method of claim 1 further comprising repairing the at least one pipeline by positioning a main pipe liner impregnated with a material capable of curing and hardening into the pipeline after the mastic material, pipe liner, and manhole liner have cured.

3. The method of claim 2 further comprising positioning an end seal between the main pipe liner and the cured pipe liner.

4. The method of claim 3 wherein the end seal comprises a tube.

5. The method of claim 3 wherein the end seal comprises a tube and a flange extending about an end of the tube, wherein the flange is positioned at least partially in the manhole.

6. The method of claim 3 wherein the end seal comprises a hydrophilic material.

7. The method of claim 3 wherein the end seal comprises a compressible material.

8. The method of claim 3 further comprising positioning a retaining ring between the end seal and the main pipe liner.

9. The method of claim 1 further comprising positioning a manhole bladder at least partially within the manhole liner and inflating the bladder to press the manhole liner against the wall of the manhole.

10. The method of claim 9 further comprising positioning a pipe bladder at least partially into the at least one pipe to press the pipe liner into contact with the pipe wall.

11. The method of claim 10 wherein the manhole bladder and pipe bladder are removed after the materials have cured and hardened.

12. The method of claim 1 wherein the mastic material and materials impregnated into the pipe liner and manhole liner cure and harden at approximately the same time.

13. The method of claim 1 wherein the manhole includes multiple pipes extending from a portion of the manhole, and further comprising applying the mastic material and positioning a pipe liner into each of the pipes.

14. A method of repairing a manhole having a bench, a barrel generally upward from the bench, a chimney extending from the barrel, and a pipeline extending from a portion of the manhole and including a pipe invert in the bench, the method comprising:
    applying a mastic material capable of curing to the bench, barrel, pipe invert, and at least partially into the pipeline;
    positioning a first pipe liner impregnated with a material capable of curing and hardening at least partially into the pipeline;
    pressing the pipe liner against a wall of the pipeline;
    positioning a manhole liner impregnated with a material capable of curing and hardening in the manhole; and
    pressing the manhole liner against a wall of the manhole.

15. The method of claim 14 further comprising repairing the pipeline by positioning a main pipe liner impregnated with a material capable of curing and hardening into the pipeline after allowing the manhole liner material to cure.

16. The method of claim 15 further comprising positioning an end seal between the main pipe liner and the first pipe liner.

17. The method of claim 16 wherein the end seal comprises a tube.

18. The method of claim 17 wherein the end seal comprises a tube and a flange extending about an end of the tube, wherein the flange is positioned at least partially in the manhole.

19. The method of claim 14 further comprising positioning a manhole bladder at least partially within the manhole liner and inflating the bladder to press the manhole liner against the wall of the manhole.

20. The method of claim 19 further comprising positioning a pipe bladder at least partially into the pipe to press the first pipe liner against the pipe wall.

21. The method of claim 20 wherein the manhole bladder and pipe bladder are removed after the materials have cured and hardened.

22. A method of repairing a manhole, comprising:
applying a mastic material capable of curing and hardening about a lower portion of the manhole and any pipes extending from the manhole;
positioning a first pipe liner impregnated with a material capable of curing and hardening at least partially into each pipe extending from the manhole, with the mastic material between the first liner and a wall of the pipes;
positioning a manhole liner impregnated with a material capable of curing and hardening into the manhole; and
pressing the first pipe liners and manhole liner against the wall of the pipes and the manhole and allowing the materials to cure and harden.

23. The method of claim 22 further comprising repairing each of the pipes extending from the manhole by positioning main pipe liners against the walls of the pipes a distance further than the first pipe liners.

24. The method of claim 22 further comprising positioning a manhole bladder at least partially within the manhole liner, and expanding the manhole bladder to press the manhole liner against the wall of the manhole.

25. The method of claim 22 wherein the mastic material and materials impregnated into the manhole liner and the first liners are configured to cure at approximately the same time to form a monolithic repaired interior of the manhole.

* * * * *